March 24, 1925.

N. MILLER 1,530,903

CINEMATOGRAPHY

Filed March 10, 1919    8 Sheets-Sheet 1

Inventor
Nicholas Miller

March 24, 1925.  N. MILLER  1,530,903

CINEMATOGRAPHY

Filed March 10, 1919  8 Sheets-Sheet 2

Inventor
Nicholas Miller

March 24, 1925. 1,530,903
N. MILLER
CINEMATOGRAPHY
Filed March 10, 1919 8 Sheets-Sheet 3
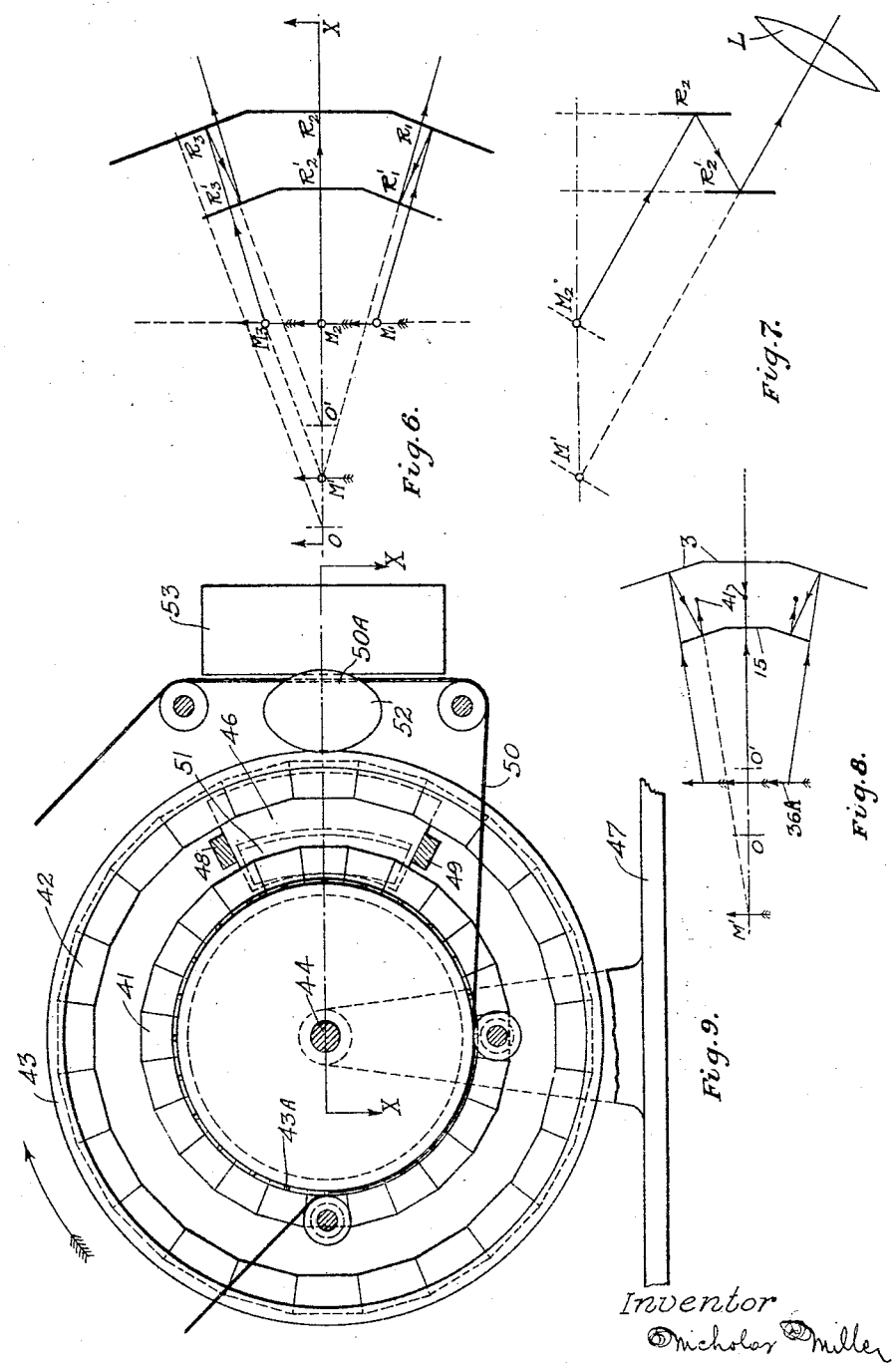
Inventor
Nicholas Miller March 24, 1925.　　　　　　　　　　N. MILLER　　　　　　　　　1,530,903
CINEMATOGRAPHY
Filed March 10, 1919　　　8 Sheets-Sheet 4
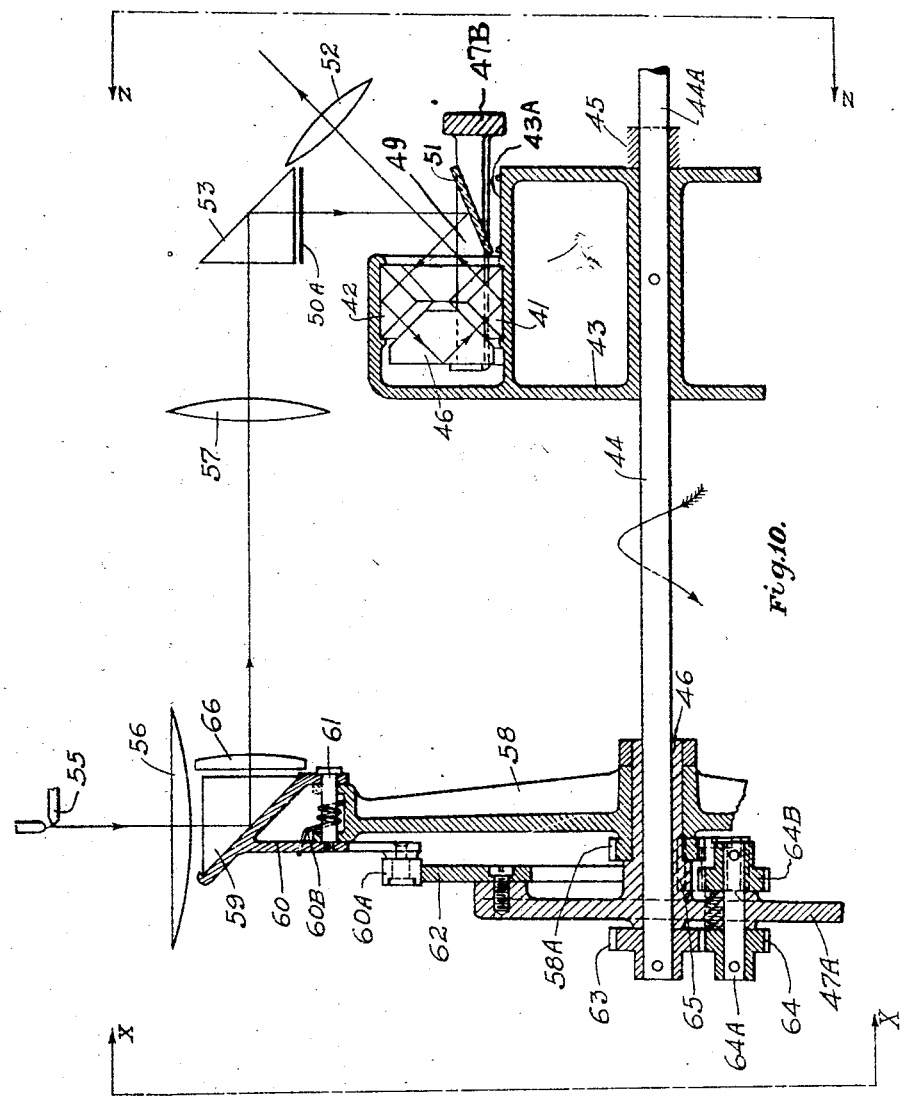
Inventor
Nicholas Miller

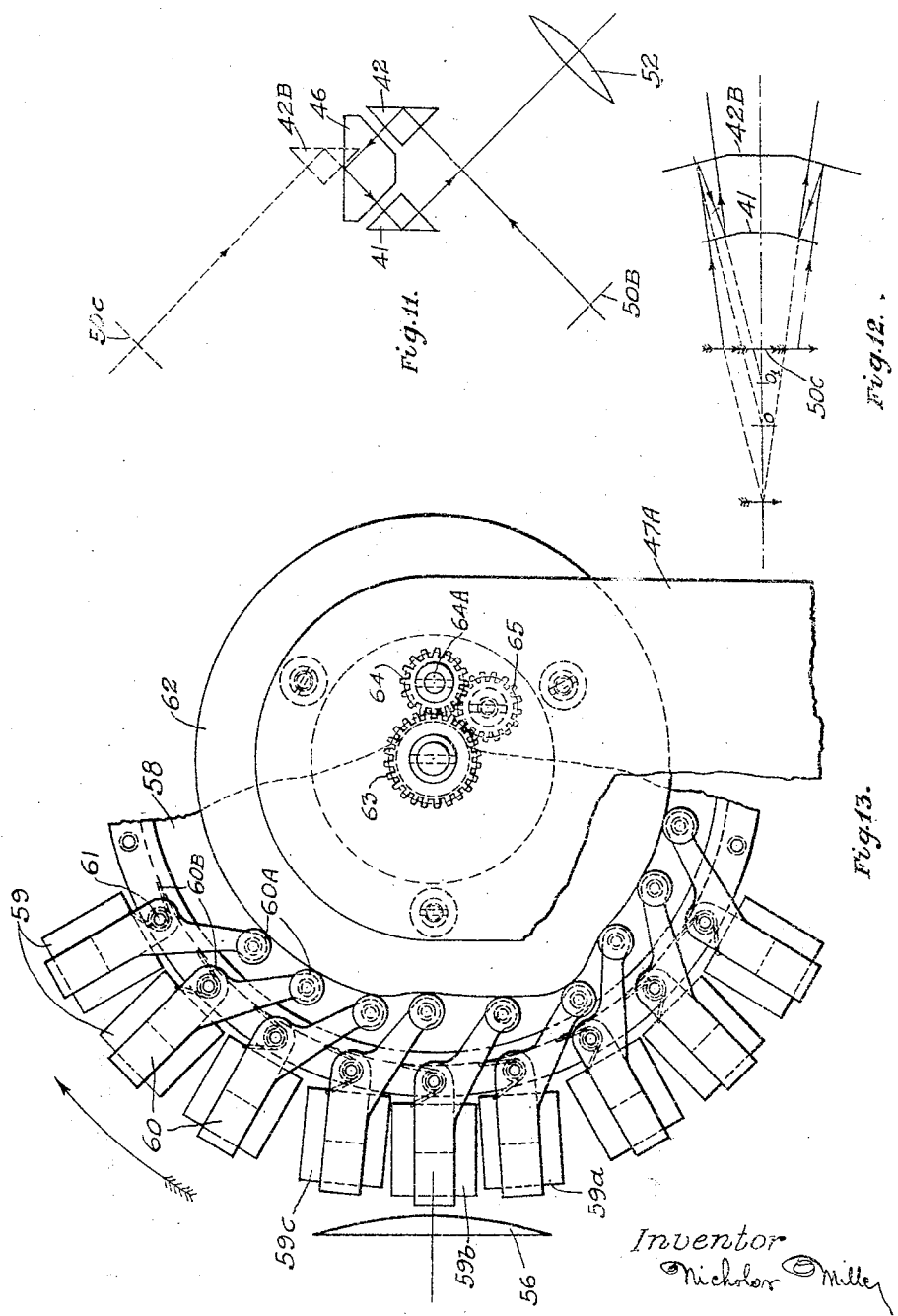

March 24, 1925.
N. MILLER
1,530,903
CINEMATOGRAPHY
Filed March 10, 1919
8 Sheets-Sheet 6
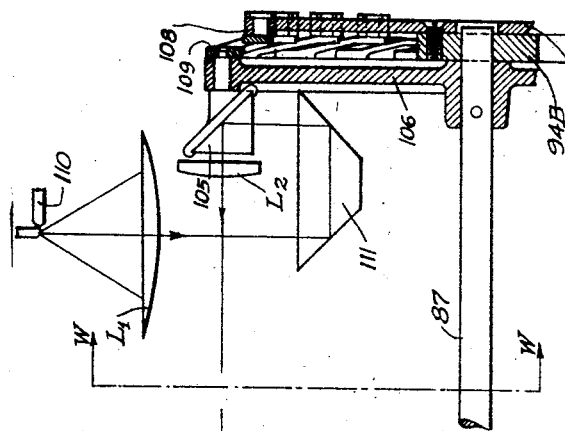
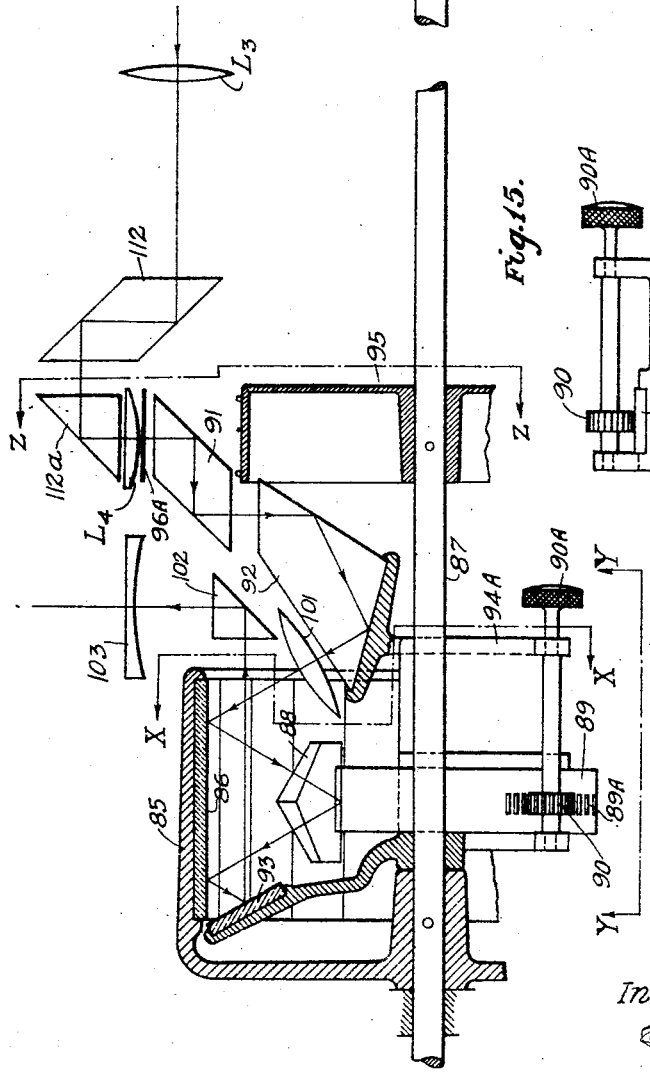
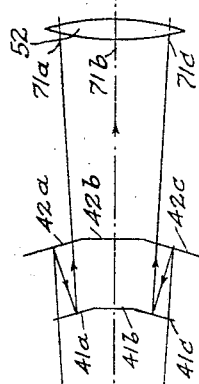
Inventor
Nicholas Miller March 24, 1925.
N. MILLER
CINEMATOGRAPHY
Filed March 10, 1919
1,530,903
8 Sheets-Sheet 7
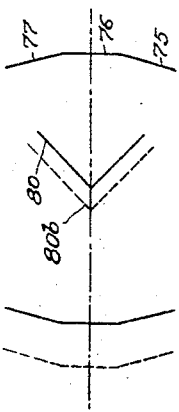
Fig.18A.
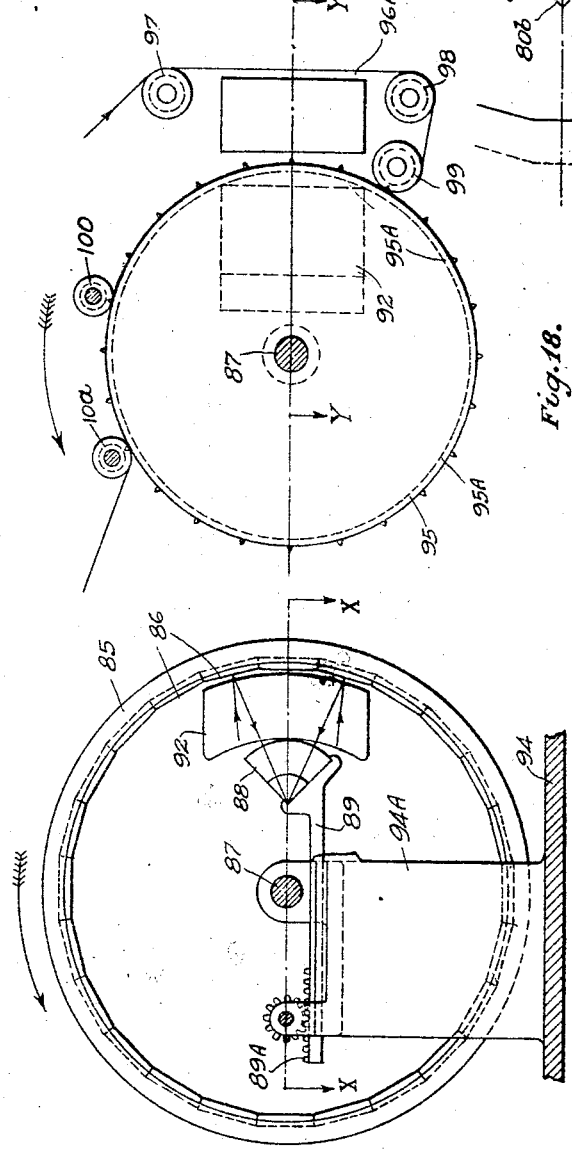
Fig.18.
Fig.17.
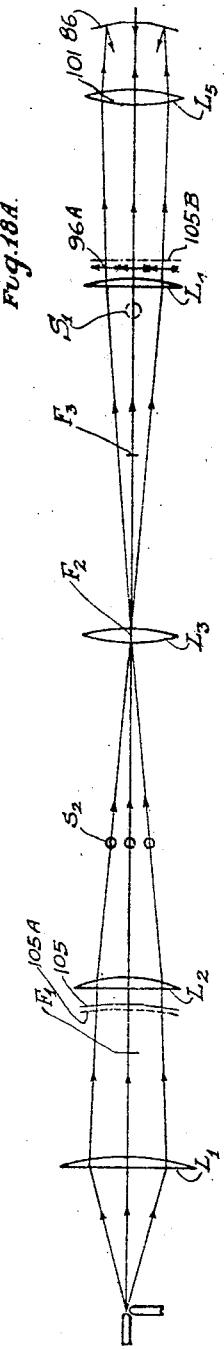
Fig.19.
Inventor
Nicholas Miller March 24, 1925.
N. MILLER
1,530,903
CINEMATOGRAPHY
Filed March 10, 1919    8 Sheets-Sheet 8
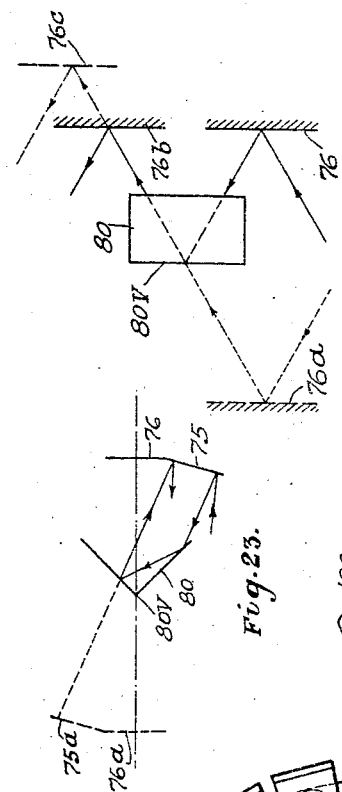
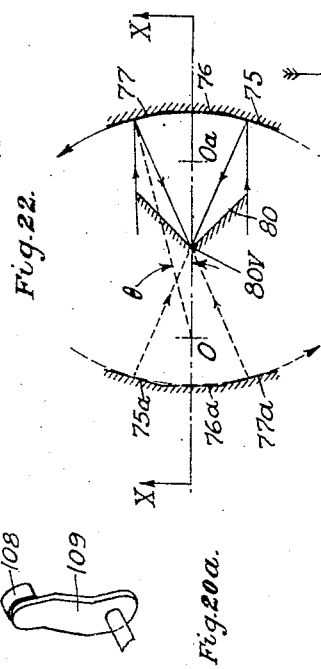
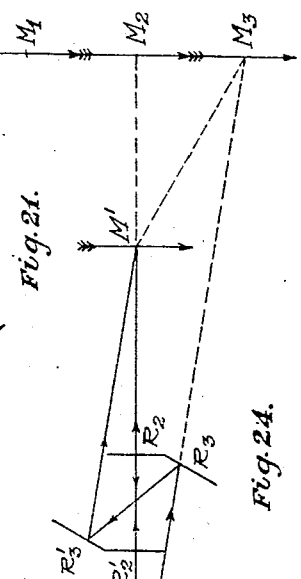
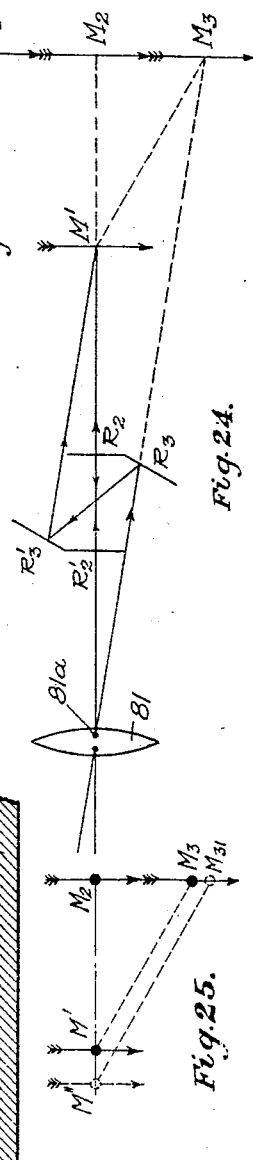
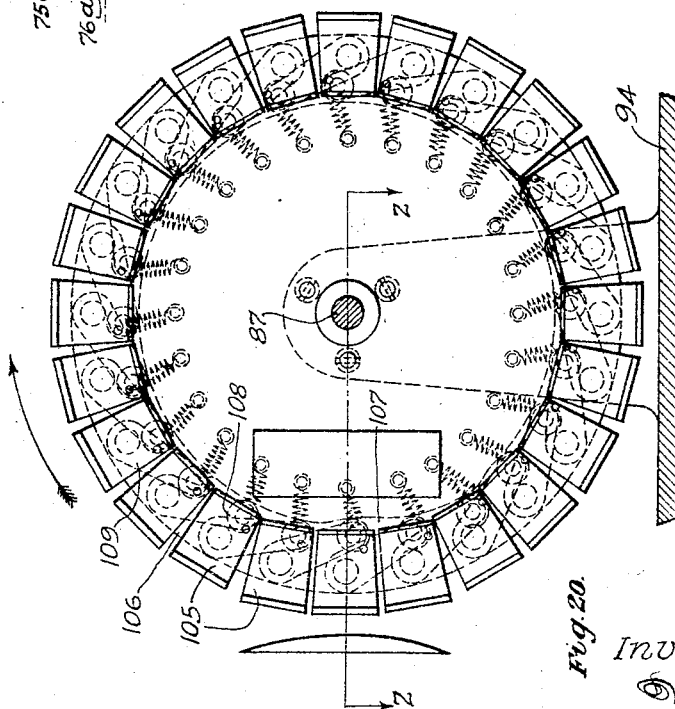
Inventor
Nicholas Miller Patented Mar. 24, 1925.

1,530,903

UNITED STATES PATENT OFFICE.

NICHOLAS MILLER, OF GRAND RAPIDS, MICHIGAN.

CINEMATOGRAPHY.

Application filed March 10, 1919. Serial No. 281,634.

*To all whom it may concern:*

Be it known that I, NICHOLAS MILLER, a citizen of the United States, residing at Grand Rapids, in the county of Kent and State of Michigan, have invented certain new and useful Improvements in Cinematography, of which the following is a specification.

The present invention relates to the class of cinematographic apparatus in which the object or film is uninterruptedly and continuously moved during its projection, the system including compensating optical elements causing the moving object on the film to be projected as a stationary image. To this end the invention embodies means whereby a high degree of precision in optical compensation is obtained and by the employment of a less number of optical elements than has heretofore been necessary in related types of apparatus. The present invention further provides a light controlling system whereby the light directed from a source is distributed to the picture images on the film and to the several optical elements and a uniform illumination of the individual picture images is obtained, also other important advantages hereinafter to be described.

It is well known that the successive images on standard commercial films vary somewhat in pitch, that is, the distance between corresponding points of two adjacent picture images. This difference results from the use of different makes of apparatus used in the manufacturing of films, from the lack of uniformity of the different devices, from the varying shrinkage of the different films under varying treatments in the process of manufacture and other causes and is unavoidable.

Optical projectors as heretofore constructed are adapted to project picture images of fixed pitch only and any variation in pitch is accompanied by unsteadiness of the projected image. The present invention is provided with a simple adjustable device whereby, differences in pitch of picture images are compensated for, permitting the steady projection of images of varying pitch.

In the accompanying drawings Figure 1 diagrammatically represents a sectional view on line "M'X" in Figure 2.

Figure 6 is another diagrammatic representation of some of the principles involved in the present invention.

Figure 7 is a sectional view of Figure 6 on line "OX".

Figure 8 is a diagram showing the reflection of the rays of the device shown in Figure 4.

Figure 9 is a partial front view of another modification of this invention as viewed in direction "ZZ", Figure 10.

Figure 10 is a partial sectional view of Figure 9 along line "XX".

Figure 11 diagrammatically illustrates the principles involved in Figures 9 and 10.

Figure 12 is a diagrammatic representation of the reflection of rays as it applies to Figures 9, 10 and 11.

Figure 13 is a partial rear view of the light controlling system in the direction "XX" in Figure 10.

Figure 14 diagrammatically illustrates the principles of the light controlling system embodied in the form of the invention represented by Figures 9 and 10.

Figure 15 is a partial sectional view of another form of this invention taken on lines "XX", "YY" and "ZZ" of Figures 17, 18 and 20 respectively.

Figure 15$^A$ is a detail perspective view of prism 88, Figures 15 and 17.

Figure 16 is a partial side view of a portion of Figure 15 viewed in direction "YY", Figure 15.

Figure 17 is a partial sectional view taken in direction "XX", Figure 15.

Figure 18 is a partial sectional view taken on line "ZZ", Figure 15.

Figure 18$^A$ is a diagrammatic illustration of the principles involved in compensating prism 88 in Figure 17.

Figure 19 diagrammatically illustrates the light controlling system as applied to the device represented in Figures 15 and 17.

Figure 20 is a partial section on line "WW", Figure 15.

Figure 20$^A$ is a detail view of arms 109, Figures 15 and 20.

Figure 21 is a diagrammatic representation of the principles underlying the optical compensation as applied to Figures 15 and 17.

Figure 22 is a sectional view on line "XX", Figure 21.

Figure 23 is a diagram similar to Figure 21 and illustrates the reflection of rays.

Figure 24 is a diagrammatic illustration further showing the principles applied in Figures 15 and 17.

Figure 25 is another diagram illustrating the principles of compensation applied to prism 88, Figures 15 and 17.

Figure 1:
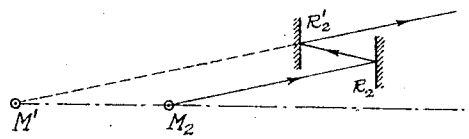
Figure 2:
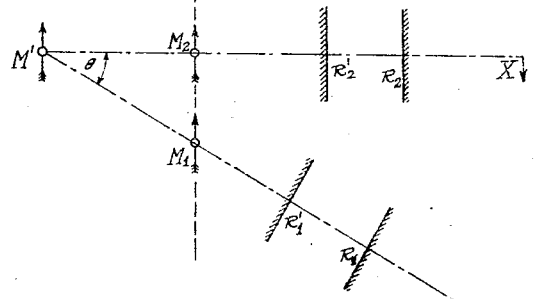
Figure 2 represents a diagram illustrating one of the principles involved in this invention.

In Figure 2, let $M_1$ and $M_2$ represent two positions of a "line object" parallel to the plane of the paper and situated in a straight line. Also let $R_1$ and $R_1'$ represent two parallel reflectors, then the virtual image of $M_1$ produced by $R_1$ and $R_1'$ will be situated on a line which is perpendicular to $R_1$ and $R_1'$ and at a distance from the object equal to twice the distance between the reflectors $R_1$ and $R_1'$. Thus if $M'$ represents the virtual image, then distance $M'M_1$ is equal to twice the distance $R_1 R_1'$ and the virtual image $M'$ is parallel to the object $M_1$. Now let the object $M_1$ move to $M_2$ and let it be desired to produce a virtual image of $M_2$ by another pair of parallel reflectors and in such a manner that it shall coincide with the previously produced virtual image $M'$. Then obviously the reflectors must be perpendicular to a line joining $M'$ and $M_2$ and be at a distance apart equal to one half the distance between the object $M_2$ and image $M'$ or, distance $M'M_2$ is equal to twice the distance $R_2 R_2'$. The reflection of rays from $M_2$ is shown in Figure 1 which shows a top view of $M' M_2 R_2' R_2$ and emergent ray from $R_2'$ is seen to virtually proceed from $M'$.

Figure 3:
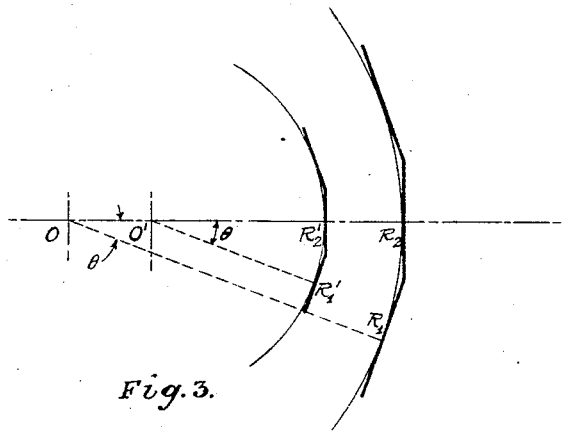
Figure 3 is a further diagrammatic representation of some of the principles applied in the present invention.

In applying the related principles to optical projection of cinematographic film images a number of problems present themselves. The first problem is to cause a virtual image, of a film image moving in a plane, to remain stationary during a predetermined movement of said film image. Thus if reflectors $R_1 R_1'$ are displaced in unison with M in such a manner, that they continuously become perpendicular to a line passing through the moving object $M_1$ and the corresponding point of the desired virtual image $M'$ and if the distance between said reflectors continuously becomes equal to one half the distance between the corresponding points of $M'$ and $M_1$ then the virtual image $M'$ will be stationary during the motion of the object $M_1$. Thus it is seen that to cause the virtual image of a moving object to be arrested by a pair of parallel reflectors, it is necessary to continuously change the relative angular position of the reflectors, the distance between them, and in unison with the moving film image. In the following discussion let the distance between the reflectors $R_1$ and $R_1'$ and between the reflectors $R_2$ and $R_2'$ be represented by $d_1$ and $d_2$ respectively. Then the distances between the corresponding object and its virtual image will be represented by $2d_1$ and $2d_2$. Now, if line $M' M_2 X$ is perpendicular to the line of objects $M_1 M_2$, we have $2d_1 = 2d_2/\cos\theta$ and $d_1 = d_2/\cos\theta$. In Figure 3 let O and O' be the centers of two similar regular polygons, and let $R_1$ and $R_1'$ and $R_2$ and $R_2'$ represent two sides of the polygons respectively. Let the line O O' extended be perpendicular to $R_2$ and $R_2'$. Let $OR_1$ be perpendicular to $R_1$ and be represented by $r_1$ and similarly $O_1 R_1'$ be represented by $r_1'$. Also let perpendicular distance between reflectors $R_1$ and $R_1'$ be represented by $d_1$ and between reflectors $R_2$ and $R_2'$ be represented by $d_2$. Let distance between centers O O' be represented by $e$, then $$d_2 = r_1 - r_1' - e$$

and $$d_1 = r_1 - r_1' - e \cos\theta$$

Thus it is evident that for reflector surfaces $R_1 R_1'$ and $R_2 R_2'$ in Figure 2 the polygonal surfaces in Figure 3 may be substituted, provided, $r_1$, $r_1'$ and $e$ are suitably chosen to satisfy the given conditions. An advantageous arrangement is obtained when the angle $\theta$ in Figure 3 is equal to the angle between corresponding points of two adjacent film images and their corresponding common virtual image. This is represented in Figure 6. The three pairs of reflectors will simultaneously reflect the three successive film images with a common virtual image. Also, if a single film image as $M_1$ is assumed to move at a uniform rate continuously and occupy successive positions $M_2$ and $M_3$ and if a pair of parallel reflectors $R_1 R_1'$ moves in unison with the film image and simultaneously occupies corresponding positions $R_2 R_2'$ and $R_3 R_3'$ then it will be apparent that for the three successive positions the corresponding virtual images will absolutely coincide, and when such is the case, then for intermediate positions the coincidence will generally be sufficiently precise for all practical purposes.

Figure 7 shows the reflection of rays and the manner in which the virtual image $M'$ may be projected by an objective L. It is to be observed that the plane of the object or film may be inclined to the reflectors as shown in dotted lines, and that the plane of the virtual image is at right angles to the optic axis. In practice, if the aperture for the film images is equal in length to one picture image, then one complete image will be projected continuously, the successive film images dissolving one into the other. If the length of the aperture is equal to two picture images, two images will be projected and any two adjacent picture images will virtually be superposed, and will continuously dissolve one into the other. This superposition of images renders the device especially adaptable to the projection of pictures in natural colors by providing the successive pictures with proper color values which when blended will cause the projected picture to appear in natural colors and without any objectionable flicker.

For the continuous superposition of two film images, the film images and their corresponding reflectors have to have an effective range equal to three picture image spaces in order that all points of two adjacent film images may continuously be projected, and therefore, the relative movements between film image and reflectors must be sufficiently precise for a period of three image spaces.

Figure 5:
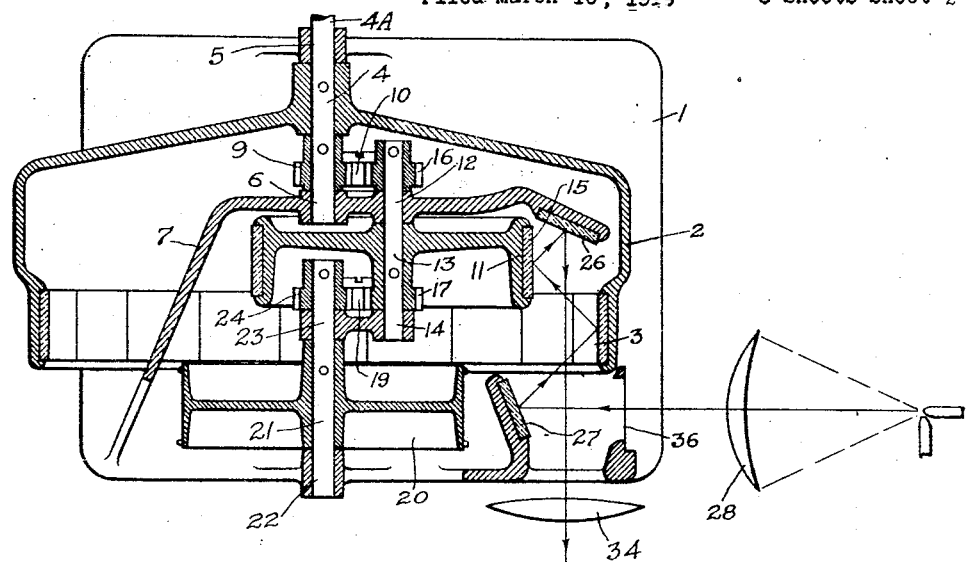
Figure 5 is a sectional view of Figure 4, on line "YY".
Figure 4:
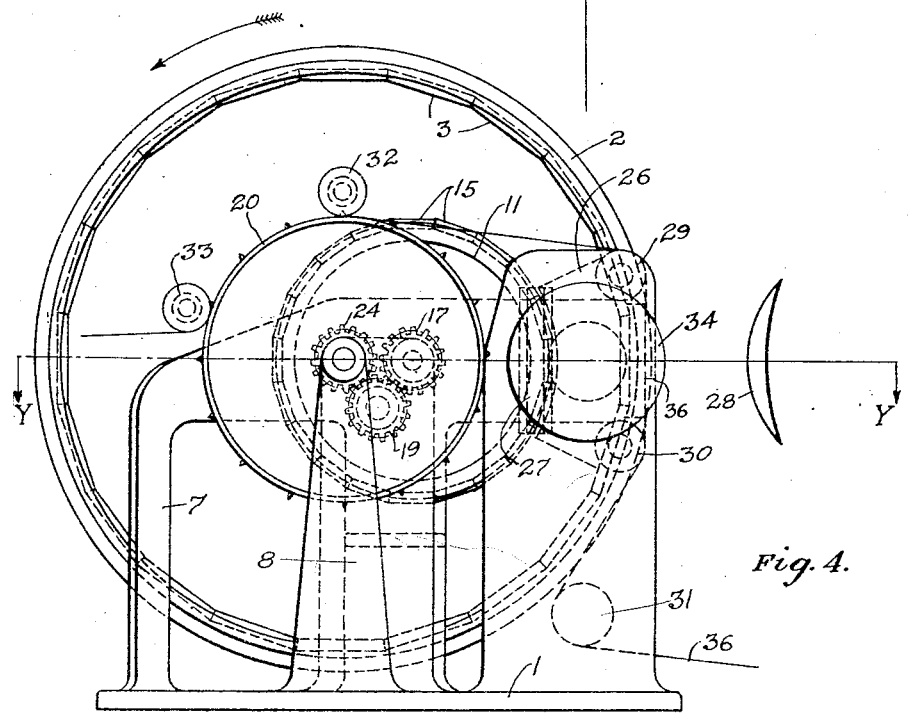
Figure 4 is a front view of one form of the apparatus.

Figures 4 and 5 represent one application of the above principles. 1 represents the base and frame for supporting the component parts of the apparatus. 2 represents a support for a series of reflectors arranged in the form of a regular polygon and is mounted on axis 4 which is rotatably supported by the frame at bearings 5 and 6. Bearing 6 is part of the frame work 7 and 8 extending into the hollow support 2 and is integral with the base 1. Shaft 4 is provided with a gear 9. Framework 7 also supports an idler gear 10 in mesh with gear 9. Another support 11 is mounted upon an axis 13 which is likewise supported by bearings 12 and 14 integral with base 1. Support 11 is likewise provided with a series of reflectors 15, similar in arrangement with reflectors 3. Shaft 13 is provided with a gear 16 in mesh with idler gear 10, and support 11 is provided with a gear 17 in mesh with another idler 19 likewise supported upon the frame. A sprocket member 20 is mounted upon a shaft 21 supported in bearings 22 and 23. Shaft 21 is provided with a gear 24 also in mesh with pinion 19. Gears 9, 16, 17 and 24 have equal pitch diameters and therefore supports 2 and 11 and sprocket 20 are geared to rotate in the same direction at a unit velocity ratio. 26 is a reflector disposed between the two series of reflectors 3 and 15 and supported by the framework. 27 is another reflector similarly supported by the frame. The operation of the device is as follows:

The film 36 is passed around a roller 31, Figure 4 and then in contact with rollers 30 and 29 to sprocket 20 and is held in contact with said sprocket by rollers 32 and 33. A portion of the film passing between rollers 29 and 30 is illuminated by concentrated rays directed upon it by condenser lens 28 and the rays upon penetrating the film are incident upon the reflector 27 and directed successively to movable reflectors 3 and 15 and thence to fixed reflector 26, from which the rays are reflected parallel to the axis of supports 2 and 11 and into the objective 34. Power may be applied to the apparatus on shaft 4 at 4$^A$ and the apparatus rotated in the direction of the arrow shown in Figure 4. The reflection of the rays is shown diagrammatically in Figure 8 in which O and O' represent the centers of the reflector supports 2 and 14, and 36$^A$ represents the film images virtually produced by fixed reflector 27. M' represents the virtual images of 36$^A$ as produced by reflectors 3 and 15, the ray emerging from reflectors 15, virtually proceeding from M' as shown by dotted line. The emerging rays are incident upon fixed reflector 26 at points 41 whence they are reflected into objective 34. Figure 5. The principles involved are those described in connection with Figures 1, 2, 3, 6 and 7.

I am aware that pairs of parallel reflectors have before been proposed for optically compensating for the moving image but in such devices the reflectors are maintained at a constant distance apart. But, as has been demonstrated, for precise compensation it is essential that the reflectors continuously change their angular position relative to the object plane (film) and that the perpendicular distance between said reflectors continuously vary with the movement of the film image. Any variation from this condition will result in a continuous change of position of the virtual image resulting in unsteady projection. This is especially true if the distance between reflectors is comparatively small, which is a requirement in practice with objectives of commercial focal lengths of desirable magnifying power. The degree of precision required also limits the size of the aperture or the number or portion of picture images which can be projected simultaneously. A comparatively great distance between the reflectors requires a relatively large number of pairs of reflectors about the axis of rotation and involves considerable labor, is expensive and is undesirably large in dimensions.

In the preferred embodiment of the invention, it is desirable to eliminate the gear connections in Figures 4 and 5. One method for accomplishing this is to mount both series of reflectors upon the same axis, and obtain the desired eccentricity or axial displacement of the two series of reflectors optically instead of mechanically. To this end either the reflective properties of reflectors or the refractive properties of glass, or a combination of both may be employed. In Figures 9 and 10 two series of totally reflecting prisms 41 and 42 are mounted upon a support 43, the opposite reflecting surfaces of said prisms being parallel in pairs and are mounted for rotation upon an axis 44, which is supported in bearings 45 and 46, said bearings being integral with base 47, Figure 9. Another totally reflecting prism 46 is disposed between reflectors 41 and 42 and is rigidly supported by members 48 and 49 which are fastened to an upwardly projecting lug $47^B$ (Fig. 10) which is integral with base 47. Part of support 43 is provided with teeth forming sprocket $43^A$ for engaging perforation of film 50. 51 is a fixed reflector opposite reflecting prism 46. 52 is the objective and 53 is a totally reflecting prism for directing the light rays upon images at $50^A$. The principle of operation is illustrated in diagrams 11 and 12. In Figure 11, $50^B$ represents the virtual image of the film image $50^A$ by reflector 51 in Figure 10. The image rays proceed from $50^B$ to reflecting prism 42 and to fixed prism 46 and reflecting prism 41. $42^B$ represents the virtual image of reflecting prism 42 by fixed prism 46, and $50^C$ is the virtual image of $50^B$ by prism 46. Thus the effect of fixed prism 46 is to cause the film image rays to proceed virtually from $50^C$, and to displace reflecting prism 42 virtually to $42^B$. It will be noticed that reflecting prism 42 is displaced parallel to itself and nearer the reflecting prism 41, said displacement being caused by the refractive properties of prism 46. Hence the final effect of the combination is equivalent to the film image being positioned at $50^C$ and reflecting prism 42 at $42^B$, with respect to reflecting prism 41 and objective 52.

In Figure 12 let $O_1$ represent the axis 44 of the revolving reflectors 41 shown in Figure 9, then O will represent the virtual axis of revolving reflectors 42 as produced by fixed prism 46 thus the virtual images of reflectors 42 which are within the range of prism 46 will be reflected as a polygon of reflectors with a virtual center at O. Hence virtual reflectors $42^B$ and reflectors 41 will be parallel in pairs and as they revolve about different fixed centers O and $O_1$ the distance between said parallel pairs of reflectors will progressively change. It will be observed that this diagram is substantially the same as the diagram shown in Figure 8, the eccentricity O, $O_1$ having been obtained optically.

One of the many difficulties to be overcome with optical projectors of the class described is encountered in illuminating the film image. There are three important conditions that must be met by a satisfactory lighting system. First, the successive film images must be illuminated with substantial uniformity over the entire picture area and this uniformity should be maintained during the passage of the film in the active zone. Second, the compensating reflectors corresponding to a picture image should receive rays only from said image and no rays from any adjacent picture images. If said reflectors receive rays proceeding from an adjacent picture image, such image will appear wholly or in part on the screen above or below the desired screen image, or produce confusion of rays and consequent blurring of the screen image, this being further the cause of considerable loss in light. Third, for clear projection, the image of the source as produced by the light condensing lenses should be at the nodal plane of incidence of the objective.

In the present invention a light controlling system is provided for the attainment of the above recited objects. In Figures 10 and 13, $47^A$ represents a portion of a framework integral with base 47, Figure 9, and it is provided with a projection 46 serving as a bearing for shaft 44 and as a support for a revolving member 58. Reflecting prisms 59 are pivotally supported upon member 58 by support pieces 60 and screws 61. Supports 60 are provided with rollers $60^A$ which cooperate with a cam 62 which is secured to frame $47^A$. Springs $60^B$ maintain contact between rollers $60^A$ and cam 62. Shaft 44 is provided with a gear 63 in mesh with a gear 64 which is mounted upon a shaft $64^A$, rotatably supported by frame $47^A$. Shaft $64^A$ is also provided with another gear $64^B$ in mesh with an idler gear 65 rotatably supported on frame $47^A$. Idler gear 65 in turn is in mesh with gear $58^A$ which is integral with member 58. Gears 63 and $58^A$ are of the same size as are also gears 64 and $64^B$, hence the rotation of shaft 44 will cause the rotation of member 58 at the same rate of speed but in the opposite direction.

56, 66 and 57 represent fixed lenses. The principles involved are illustrated diagrammatically in Figure 14. In this diagram all the essential elements are represented along a straight line in their proper order, all non-essential elements being omitted. Light rays from source 55 are incident upon lens 56 and are converged upon light controlling reflectors or reflecting prisms 59 which direct the light through lens 66. The combined focal lengths of lenses 56 and 66 are such that they form an image of the source at $70^b$, and the successive angular positions, $59^a$, $59^b$ and $59^c$ assumed by the light controlling reflectors successively shift the image of the source from $70^a$ to $70^b$ and $70^c$. Also, if $59^a$, $59^b$ and $59^c$ represent three adjacent reflectors, then $70^a$, $70^b$ and $70^c$ represent corresponding images of the source formed by their respective reflectors. $59^e$, $59^f$ and $59^g$ are the virtual images of reflectors $59^a$, $59^b$ and $59^c$ as formed by lens 66. Lens 57 has its focal point at E and it is so positioned relative to the film images $50^a$, $50^b$ and $50^c$ and objective 52 that it will superpose real images of reflectors $59^a$, $59^b$ and $59^c$ upon the said film images, and project the images of the source $70^a$, $70^b$ and $70^c$ into the first nodal plane of the objective at $71^a$, $71^b$ and $71^c$.

$41^a$, $41^b$ and $41^c$ and $42^a$, $42^b$ and $42^c$ represent the compensating reflectors. It will be observed that the image of the source $70^a$ corresponding to a light controlling reflector ($59^a$) contains only rays that are incident upon and reflected by said reflector and therefore images of said reflector and of said image source produced simultaneously (by lens 57) will be connected by rays common to both of these images. Thus if a real image of a light controlling reflector $59^a$ is superposed upon a film image $50^a$ and if simultaneously a real image of a corresponding image source $70^a$ is produced at $71^a$, then all light rays passing through $50^a$ are focused at $71^a$ and are independent or separate from rays passing through an adjacent film image $50^b$. Hence only rays corresponding to their respective picture images will be incident upon the compensating reflectors. In the present arrangement, the number of light controlling reflectors is equal to the number of pairs of compensating reflectors and they travel in opposite directions. It is to be observed that in the place of single lenses 56, 66, etc., a system of lenses may be employed and that many modifications in the present arrangement can be made without deviating from the principles involved.

In Figures 21 and 22 another modification of the invention is diagrammatically illustrated. Here O represents the center of a regular polygon with sides of reflecting surfaces 75, 76 and 77. 80 represents a right angled reflector with its vertex $80^v$ on the perpendicular bisector of reflector 76. Ray reflected from reflectors 75, 76 and 77 and incident upon the reflectors 80 are reflected in a direction parallel to the incident ray. This is illustrated in Figure 23. Rays directed to the apex $80^v$ are returned in the same plane, as illustrated in Figure 21. The virtual images of reflectors 75, 76 and 77 as formed by reflectors 80 are represented at $75^a$, $76^a$ and $77^a$ respectively, and rays reflected by reflectors 80 virtually proceed from them. Now if the reflectors 75, 76 and 77 are revolved about their axis O, their virtual images $75^a$, $76^a$ and $77^a$ will appear to revolve about an axis $O^a$, and the arcuate path of the reflectors 75, 76, etc., intersects the virtual path of the image $75^a$, $76^a$, etc., of the same reflectors if these paths are sufficiently extended.

It is well known that the virtual image of an object formed by a right angled reflector is parallel to the object and corresponding points are situated on lines passing through the apex $80^v$, said object and corresponding image points being equidistantly situated relative to said apex. Thus it follows that a reflector plane 75 and its corresponding virtual image form a pair of parallel reflectors and that they are maintained in parallel relation during their revolution about their respective axes and that the distance between said reflector plane and its corresponding virtual image continuously varies.

In Figure 22 the reflector 80 produces an effect equivalent to two parallel reflectors positioned at $76^a$ and $76^b$. Let the distance $O\ O^a$ be equal to $e$ and let $O$—77 be perpendicular to reflector 77 and let it be represented by $r$. Also let the perpendicular distance between reflector 77 and its corresponding virtual image $77^a$ be represented by $d$. Then it can be shown that $d = 2r - e \cos \theta$.

In Figure 24 let 81 represent an objective and $81^a$ its nodal point of emergence and let $M_1$, $M_2$ and $M_3$ represent three successive positions of picture images formed by said objective 81. Also let $R_2\ R_2'$ and $R_3\ R_3'$ be pairs of parallel reflectors positioned in path of image rays corresponding to images $M_2$ and $M_3$ respectively. Then images $M_2$ and $M_3$ will be reflected to a position $M'$ provided the distance between $R_2\ R_2'$ is equal to one half of distance $M'\ M_2$ and that said reflectors are perpendicular to line $M'\ M_2$ extended, and, the distance between reflectors $R_3\ R_3'$ is equal to one half the distance $M'\ M_3$ and that said reflectors are perpendicular to line $M'\ M_3$ extended.

Thus it is evident that in place of the reflectors in Figure 24, the system of reflectors illustrated and described in connection with Figures 21, 22 and 23 may be substituted and it will further be apparent that with such an arrangement it is possible to obtain absolute compensation for at least three successive positions of a picture image, said successive image positions are preferably chosen to correspond to three adjacent image positions $M_1$, $M_2$ and $M_3$ and when such is the case, the compensation will generally be sufficiently accurate for all intermediate positions.

From the foregoing it is obvious that $M_1$, $M_2$ and $M_3$ may represent three adjacent picture images and that all of said images can be reflected at $M'$ in superposed relation, thus obtaining a most satisfactory method for the blending of colors of adjacent picture images according to the primary color principle.

It is to be observed in Figure 22 that reflector surfaces 76 and $76^b$ need not be situated in the same plane but may be situated in parallel planes as illustrated in dotted lines at $76^c$. In this case reflector 76 and $76^c$ would be the sides of two similar regular polygons arranged concentrically about a common axis. Such an arrangement permits greater latitude in calculating the optical compensation for a given set of conditions.

It is well known that the spacings of film images on different commercial films vary somewhat and therefore it is desirable to adopt a device of this nature to accommodate films of different spacings. In connection with Figure 24 it has been explained that there is a definite relation between the adjacent picture images and the corresponding reflector planes, for the precise maintenance of a stationary image at M'. Hence it follows that if the distance between adjacent picture images on the film varies, there has to be a corresponding change in the relations of successive pairs of reflectors. In Figure 25, let $M_2$ and $M_3$ represent the centers of two adjacent images and let M' represent their common image position as explained in connection with Figure 24. Also let $M_2$ and $M_{31}$ represent the centers of two adjacent images differing from $M_2$ $M_3$. Then if a corresponding image position M'' is so selected that line M' $M_3$ is parallel to line M'' $M_{31}$, it follows that in changing the relation of the reflectors it is necessary to alter only the relative distance between them, their angular position remaining unchanged.

This can conveniently be accomplished by the shifting of reflector 80 with its vertex on line O $O^a$. In Figure $18^A$, by shifting reflector 80 to $80^b$ the virtual image of the reflectors is correspondingly shifted changing the effective distance between the corresponding parallel reflectors, and thereby compensating for the variation between adjacent picture images of different films.

In Figures 15 and 17, on a revolving support 85, reflectors 86 are mounted. 88 is a totally reflecting prism adjustably mounted upon a slide 89 (Figure 16) which is provided with teeth $89^A$ and adapted to cooperate with a pinion 90 which is actuated through a knurled knob $90^A$. A sprocket 95 is fixed upon axis 87 and the film $96^A$ is guided by rollers 97, 98, 99, 100 and $10^a$ which are fixed relative to the frame $94^A$, Figures 17 and 18.

101 is an objective and 102 a fixed prism. 103 is a divergent lens for enlarging the image formed by objective 101. Prism 88 is a right angular wedge cut from the frustum of a double cone and it permits the incident and emergent rays to enter and emerge at substantially right angles to the refracting surface. (See also Figure $15^A$.)

In Figure 15 the picture rays are successively directed to fixed reflecting prisms 91 and 92, to objective 101, to revolving reflectors 86, to reflecting prism 88, to revolving reflectors 86, to fixed reflector 93, to fixed prisms 102 and to enlarging lens 103. Objective 101 corresponds to objective 81 in Figure 24, and reflectors 86 to reflectors 75, 76 and 77, and right angle reflecting prism 88 to right angled reflector 80, in Figures 21, 22, 23 and $18^A$. Lens 103 serves to magnify the arrested image M, Figure 24, which may be projected and viewed on the screen.

In the discussion of the functions of prism 88 in connection with the diagrams, the refractive effect of glass has been neglected for the sake of simplicity. It is to be observed that prism 88 is adjustable during the operation of the device.

The manipulation of the light is obtained by a series of reflecting prisms 105 which are rotatably mounted upon a support 106, said support being directly mounted on axis 87, and revolving in a bearing $94^B$ which is integral with $94^A$ and base 94. The individual reflecting prisms 105 are controlled by fixed cam 107 cooperating with roller 108 of arms 109 which are in a fixed relation to reflecting prisms 105. Light rays from the source 110 are directed to a lens $L_1$, fixed prism 111, reflecting prism 105, lenses $L_2$ and $L_3$, reflecting prisms 112 and $112^a$ and lens $L_4$. The object is to split the volume of light into adjacent sectional volumes of light by reflectors 105, focus the images of said reflectors upon the film images $96^A$, and the image of the source into the nodal plane of incidence of objective 101, and to move the said images of reflectors 105 in unison and synchronism with film images $96^A$. In accomplishing this there will result (1) a uniform illumination of a film image during its effective travel past the objective or the uniform illumination of adjacent film images simultaneously. (2) Clearness of the projected image since the rays of adjacent picture images are maintained continuously separated, preventing the confusion of the projected images and insuring maximum economy in light. (3) Good definition of the projected image.

It is to be observed that in this arrangement the final images of the film and of the source travels in the same direction, allowing the reflectors 105 to be mounted directly upon axis 87, Figure 15, and it also permits a close adjustment of the relative sizes of the final reflector images and the final images of the source.

In the diagrammatic illustration in Figure 19, all unessential optical elements are omitted. $F_1$, $F_2$, and $F_3$ represent the focal points of lenses $L_1$, $L_2$, and $L_3$ respectively. Lens $L_1$ forms an image of the source at $S_1$ which is reflected by reflectors 105 into lens $L_2$ forming images $S_2$. The combined focal length of lenses $L_3$ and $L_4$ is such as to focus the images $S_2$ into the nodal plane of incidence of objective $L_5$. $105^A$ are the virtual images of reflectors 105 formed by lens $L_2$ and said images $105^A$ are projected by lens $L_3$ to $105^B$, and said images $105^B$ are superposed upon film images $96^A$ by lens $L_4$. It is to be noted that reflectors 105 and film images $96^A$ travel in opposite directions.

In place of simple lenses, systems of lenses could be employed. Objective 101 and magnifying lens 103 are preferably provided with the usual focusing means.

The foregoing discussion is to be considered as descriptive of typical examples of the invention and the illustrations merely as diagrammatic, since the principles involved can be incorporated in structures differing widely in form and arrangement.

What I claim as new and desire to secure by Letters Patent is:

1. In a cinematographic apparatus, a plurality of compensating reflectors adapted to revolve about an axis, a series of picture images, means for moving the picture images and said compensating reflectors in unison, a source of light, means for directing the light rays upon the picture images and said compensating reflectors, and a relatively fixed optical element adapted to receive the picture rays from the compensating reflectors and direct them back upon the same reflectors.

2. In a cinematographic apparatus, a plurality of compensating reflectors, a series of picture images, and means for moving the picture images and the compensating reflectors in unison; a source of light, a relatively fixed optical element, means for directing the light rays to the compensating reflectors and to said optical element to optically displace said reflectors, the optically displaced reflectors moving in a virtual path which intersects the path of the compensating reflectors.

3. In a cinematographic apparatus, a plurality of compensating reflectors adapted to revolve about an axis, a source of light, means for optically displacing said reflectors, and for causing the optically displaced reflectors to rotate about a virtual axis which is eccentric to the real axis of the reflectors, and means for moving the picture images in unison with said reflectors.

4. In a cinematographic apparatus two series of compensating reflectors adapted to revolve about a common axis, a source of light, a relatively fixed reflecting element adapted to receive rays from one of the series of compensating reflectors, and to direct said rays to the other series of compensating reflectors, for optically displacing the first recited series of reflectors relative to the last recited series of reflectors and for causing the optically displaced reflectors to rotate about a virtual axis which is eccentric to the real axis of said reflectors.

5. In a cinematographic apparatus, a series of picture images, a series of compensating reflectors and means for moving the picture images and the compensating reflectors in unison; a source of light, means for directing the light rays upon the picture images and the compensating reflectors, and a relatively fixed optical element for receiving the picture rays from the compensating reflectors and for directing them back upon the same reflectors.

6. In a cinematographic apparatus, two parallel series of compensating reflectors, a series of picture images, a relatively fixed optical element disposed between the two series of compensating reflectors, a source of light, means for directing picture rays, successively to one series of reflectors, to the relatively fixed optical element and to the other series of reflectors and means for moving the picture images in unison with said compensating reflectors.

7. In a cinematographic apparatus, a series of picture images, a plurality of compensating reflectors, a source of light, a relatively fixed right angled reflecting member adapted to receive picture rays successively from each of said compensating reflectors to optically displace each of said compensating reflectors and means for moving the picture images in unison with the compensating reflectors.

8. In a cinematographic apparatus, a series of reflectors mounted to revolve about a common axis, means for optically displacing said reflectors, each reflector being optically displaced parallel to itself, means for continuously varying the distances between the parallel reflectors during the operation of the apparatus, and means for moving picture images in unison with said reflectors.

9. In a cinematographic apparatus, a series of compensating reflectors revolving about a common axis, a series of picture images, and means for moving the reflectors and the picture images in unison; a source of light, an optical element disposed between the picture images and the reflectors, means for directing the picture rays upon the compensating reflectors and upon the optical element for optically displacing said reflectors and for causing the optically displaced reflectors to revolve about a virtual axis which is eccentric to the real axis of the reflectors and means for adjusting the position of said optical element.

10. In a cinematographic apparatus, a plurality of compensating reflectors, a series of picture images, and means for moving the reflectors and the picture images in unison; a source of light, a right angled reflecting prism disposed between the picture images and the compensating reflectors, means for directing the picture rays to the compensating reflectors and to said right angled reflecting prism for optically displacing said reflectors, and provision for adjusting the position of said right angled reflecting prism.

11. In a cinematographic apparatus, means for continuously moving a series of picture images, cooperating devices adapted to optically arrest said picture images, and means for adapting the apparatus to the projection of differently spaced picture images, said last recited means being adjustable during the operation of the device.

12. In a cinematographic apparatus, a series of picture images, a series of compensating optical devices, a source of light, a series of optical elements one for each one of said compensating optical devices for directing the light rays successively to the picture images and to the compensating optical devices, the area of each of said optical elements being substantially limited to a section of the marginal rays belonging to a picture image, and means for moving the picture images the compensating optical devices and optical elements in unison.

13. In a cinematographic apparatus, a series of picture images, a plurality of compensating reflectors revolving about a common axis, a plurality of optical elements one for each one of said compensating reflectors, a source of light, means for moving the optical elements through the path of light and at the same angular velocity as the compensating reflectors, for directing light rays successively to the picture images and corresponding compensating reflectors, and means for moving the picture images in unison with the compensating reflectors.

14. In a cinematographic apparatus, a series of picture images, a plurality of compensating optical devices, a source of light, a plurality of optical elements adapted to move through the path of light, for directing light rays upon the picture images and the compensating reflectors, means for imparting to each of said optical elements, another and different movement during their travel through the path of light, and means for moving the picture images, the compensating optical devices and the optical elements in unison.

15. In a cinematographic apparatus, a series of picture images, a plurality of compensating reflectors revolving about an axis, a source of light, a plurality of optical elements revolving about an axis for directing light rays to the picture images and the compensating reflectors, means for imparting to each of said optical element an independent rocking movement, during their movement through the path of light, and means for moving the picture images, the compensating reflectors and the optical elements in unison.

16. In a cinematographic apparatus, a series of picture images, a series of compensating reflectors, a source of light, series of optical elements, for directing light rays successively upon the picture images and corresponding compensating reflectors, the area of each of said optical elements being substantially limited to a section of the marginal rays belonging to a picture image, means for revolving the compensating reflectors and optical elements about a common axis and in unison with the movement of the picture images.

17. In combination with a cinematograph, a source of light, a series of optical elements adapted to receive the light rays; a series of picture images, a plurality of optical compensating devices and means for moving the optical elements, the picture images and the optical compensating devices in unison; a lens disposed between the optical elements and the picture images for focusing an image of the optical elements substantially upon the picture images during their effective travel.

18. In combination with a cinematograph, a source of light, a series of optical elements adapted to direct the light rays; a series of picture images, a plurality of optical compensating devices, and means for moving the optical elements, the picture images and the optical compensating devices in unison; a lens positioned with one of its nodal planes substantially upon, or in close proximity of the picture images, and another lens positioned to receive the rays from the optical elements and to project an image of the optical elements substantially upon the other nodal plane of the first mentioned lens.

19. In combination with a cinematograph, a source of light, a series of optical elements for directing the light rays; a series of picture images, a plurality of optical compensating devices and means for moving the optical elements, the picture images and the optical compensating devices in unison; an objective, a lens system for receiving the directed rays from the optical elements, and for projecting the images of the optical elements substantially upon the picture images, and an image or images of the source upon the nodal plane of incidence of the objective.

20. In a cinematographic apparatus, means for moving a series of picture images in unison with a plurality of compensating optical devices, a source of light, means for separating the light rays into adjacent portions corresponding to the film images, means for projecting images of the separating means upon the picture images, said means for separating the light rays being adapted to maintain the picture rays corresponding to the different picture images independent of each other.

21. In a cinematographic apparatus, means for moving a series of picture images in unison with a plurality of compensating optical devices, a source of light, an objective, means for separating the light rays into adjacent portions, means for focusing the separating means upon the film images, means for moving said separating means in synchronism with the picture images, and provision for directing the source or images of the source substantially to the nodal plane of incidence of the objective.

22. In a cinematographic apparatus, means for moving a series of picture images in unison with a plurality of compensating optical devices, a source of light, a series of optical elements adapted to cooperate with the source of light to separate the light into adjacent portions, means for focusing said optical elements upon corresponding picture images, means for moving said optical elements in synchronism with the picture images and the compensating optical devices, said optical elements being adapted to maintain the separation of the different picture rays.

23. In a cinematographic apparatus, means for moving a series of picture images in unison with a plurality of compensating optical devices, a source of light, an objective, a plurality of optical elements disposed in the path of light and adapted to separate the light into sections of light, means for focusing an image of said optical elements upon corresponding picture images and means for moving the focused images in synchronism with said picture images and provision for directing an image or images of the source into the nodal plane of incidence of the objective.

NICHOLAS MILLER.

Witnesses:
HARRY A. COTTON,
LOUISE S. BURTON.